Feb. 12, 1957  T. R. KENNEDY  2,781,487
VOLTAGE REGULATING SYSTEM
Filed Jan. 6, 1954  2 Sheets-Sheet 1

INVENTOR.
THEODORE R KENNEDY
BY Albert Sperry
ATTORNEY

United States Patent Office 2,781,487
Patented Feb. 12, 1957

2,781,487

VOLTAGE REGULATING SYSTEM

Theodore R. Kennedy, Lower Makefield Township, Pa., assignor to Ajax Electrothermic Corporation, Trenton, N. J., a corporation of New Jersey Application January 6, 1954, Serial No. 402,494

4 Claims. (Cl. 322—36)

This invention relates to voltage control systems and is directed particularly to systems wherein a saturable core reactor is utilized in controlling the operation of a generator.

It has been suggested heretofore that the operation of a generator could be controlled by varying the current supplied to the field winding of the generator in response to the difference between the voltage of the armature circuit and a constant reference voltage. In using a saturable core reactor in such a system, the control current is generally fed from a network comprising a number of resistor elements connected in such manner that the current is proportional to the difference in voltage between the constant reference voltage and the armature voltage but without provision for maintaining the polarity of this current constant over the range of possible differences which might exist between the reference and armature voltages. The reactive winding of the saturable core reactor is included in the generator field winding circuit and its impedance and, consequently, the flow of current in the field winding, are thereby regulated in response to the varying flux in the core.

While such systems are sometimes effective, they are not sufficiently sensitive for many purposes and have the inherent danger of reversing upon sudden or severe change in the loading of the armature circuit. Under such conditions, the control winding which is supplied with current in response to changes in the voltage of the armature circuit may momentarily induce a flux in the core which is in excess of that produced by the current from the constant voltage source. The flux of the core will then be reversed whereupon the impedance of the reactive windings will be reduced and the flow of current in the field winding will be increased instead of being further reduced. Such an increase in the field current while the armature voltage is excessive will have a cumulative effect on the generator which will aggravate the very condition the system is designed to control. The generator voltage may then rise to dangerous values and the generator will be completely out of control.

In accordance with the present invention these limitations and objections to voltage control systems of the prior art are overcome and means are provided which positively prevent reversal of the flux in the core of a reactor and afford sensitive control of the armature voltage and generator operation.

These advantages are attained by controlling the current in the generator field winding by a saturable core reactor including a single control winding to which unidirectional current is supplied from a constant voltage reference source in proportion to a difference in voltage between the constant voltage source and the armature voltage. A biasing resistance is employed to couple the constant reference voltage circuit and the armature voltage circuit, whereas a rectifier in the constant reference voltage circuit serves to insure unidirectional flow of current in the control winding. Reversing of the current in the control winding, and of the flux in the core, are thus prevented and control of the generator is rendered more positive.

One of the objects of the invention is to provide improved voltage regulating means for use with a generator.

Another object of the present invention is to control the operation of a generator through the action of a saturable core reactor in which the flux induced by a control winding is variable but unidirectional.

A further object of the invention is to increase the sensitivity and measure of control which can be effected in voltage regulators embodying a saturable core reactor.

A specific object of the invention is to provide a voltage regulator including a saturable core reactor with a single control winding supplied by current flowing through a rectifier so as to prevent reversal of the current in the control winding and varied in value by opposed constant and variable voltage sources coupled through a biasing resistance.

These and other objects and features of the present invention will appear from the following description thereof wherein reference is made to the figures of the accompanying drawing.

Figure 1:
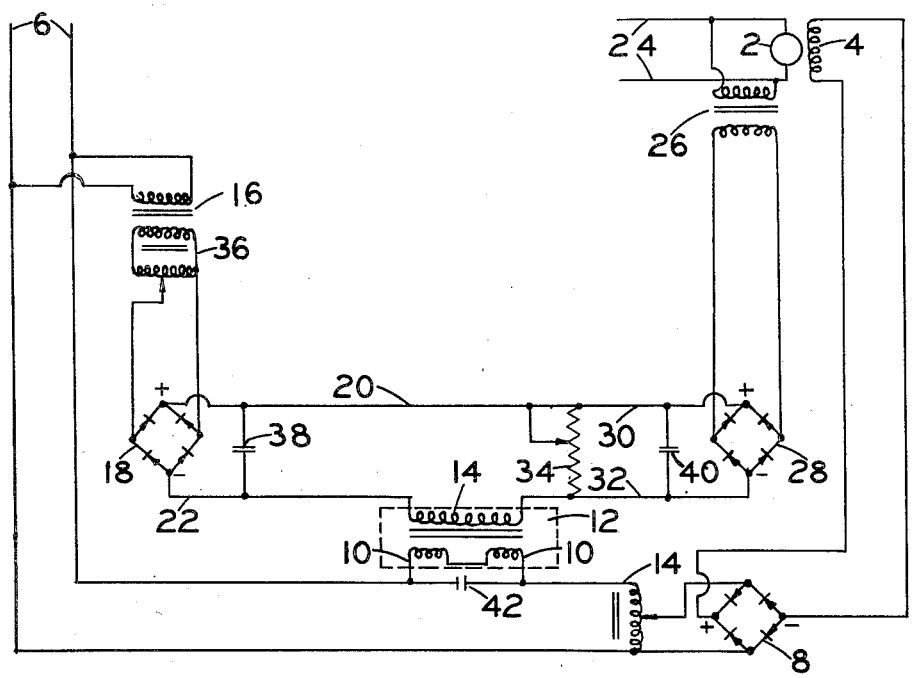
Fig. 1 is a circuit diagram illustrating a typical voltage regulator system embodying the present invention.

In that form of the invention chosen for purposes of illustration in Fig. 1 a generator 2 is provided with a field winding 4 supplied with current from a suitable source such as power lines 6 through the rectifier 8 to excite the generator. The flow of current in the field winding circuit is controlled by variation in impedance of reactive windings 10 included in the generator field winding circuit. The reactive windings are applied to the outer legs of the core of a saturable core reactor 12, whereas a control winding 14 is applied to an inner leg of the core for varying the direct current flux within the core.

As in most saturable core reactors used for generator control, the impedance which the reactive windings 10 will present to the flow of alternating current in the generator field winding circuit depends upon the degree of magnetic saturation of the core of the reactor. The impedance of the reactive windings is, therefore, dependent upon the amount of direct current flux existing in the core which, in turn, is dependent upon the amount of direct current flowing in the control winding. If the core is already saturated with magnetic flux by the action of the direct current control winding 14, the alternating current in the reactive windings 10 can produce little or no additional flux in the core and as a result, the impedance of the reactive windings will be relatively low. A large current flow can then take place through the field winding circuit. However, if the direct current in the control winding is reduced or insufficient to saturate the core of the reactor, the additional magnetizing effect which the alternating current in the reactive windings 10 will have upon the core will increase the impedance of the reactive windings 10. Control of the impedance of the generator field winding circuit is therefore effected by variation in the flow of direct current in the control winding 14 of the saturable core reactor.

In order to insure effective and sensitive control of the generator 2 in accordance with the present invention, the control winding 14 of the reactor is supplied with unidirectional current from a constant voltage source in proportion to a difference in voltage between the constant voltage source and the voltage from the generator armature. The constant voltage reference source preferred and illustrated in Fig. 1 is a constant voltage transformer 16 which supplies current through the rectifier 18 to the lines 20 and 22, the control winding 14 of the reactor being included in the line 22. The opposing armature circuit current is supplied from armature circuit 24 through potential transformer 26 and rectifier 28 to lines 30 and 32. The constant reference voltage circuit and the armature voltage circuit are coupled through a biasing resistance 34 so that the opposing currents from the rectifiers 18 and 28 are applied across the biasing resistance.

The constant voltage transformer 16 illustrated in Fig. 1 receives current from the power lines 6, which incidentally also supply the current for the field winding 4 of the generator through rectifier 8. These power sources need not be common and either can be any dependable source of alternating current. The constant voltage transformer may have an adjustment for establishing a predetermined voltage setting for the current supplied to the rectifier 18 and the corresponding current to be supplied to line 20 and 22 of the constant reference voltage circuit or it may feed a variable output auxiliary transformer 36 as shown. The output current from rectifier 18 will determine the degree of direct current saturation of the core of the reactor corresponding to the minimum impedance which the reactive windings 10 in the generator field winding circuit will present under the selected conditions of operation. Actually the variable output constant voltage or auxiliary transformer is far more useful than merely as an adjustment for the regulating system. It controls the voltage of the generator proper over substantially its full range and maintains the voltage constant at any desired setting within that range. The transformer principle in this respect is greatly superior to potentiometers or rheostats since its output is but slightly affected by loading. During normal conditions of operation of the generator the impedance of the reactive windings 10 will be maintained substantially above a minimum by reason of the reduction in current flow in the control winding 14 due to the opposing voltage supplied from the armature circuit across the biasing resistance 34. The current normally flowing through the control winding 14 accordingly is balanced in accordance with the difference between the voltages of the armature circuit and the constant voltage source. In this way the impedance of the reactive windings 10 and the amount of current flowing in the field winding 4 are similarly balanced. An increase in armature circuit voltage will produce an increase in the impedance of the reactive windings and a compensating decrease in the excitation of the generator field windings, whereas a decrease in the voltage of the armature circuit will permit an increased flow of current in the field winding.

Furthermore, since the control winding 14 of the reactor is included in series with rectifier 18 in the constant reference voltage circuit, current can flow in only one direction through the control winding. Rectifier 18 will block any oppositely directed current and, therefore, reversal in direction of the control flux in the core of reactor 12 cannot occur. The flux will, instead, be unidirectional and will vary in response to the difference between the opposing voltages supplied by the constant reference voltage circuit and the armature voltage circuit. Should the armature voltage become greater than the constant reference voltage at any time, the rectifier 18 will prevent any flow of current in the control winding 14, whereupon the maximum impedance of reactive windings 10 will become effective to limit the flow of current in the generator field winding circuit to a minimum until normal conditions are restored.

In certain cases, wave form characteristics of the armature voltage may affect the ratio of the rectified voltage to the R. M. S. value of the alternating current voltage. This may sometimes be compensated by connecting condensers 38 and 40 across rectifiers 18 and 28 as shown in Fig. 1. Furthermore, in order to tune the reactor, as for example, to balance out the magnetizing component of the current through reactor 12 for zero control current, means such as or including a condenser 42 may be connected in parallel with reactive windings 10 of the field circuit.

Figure 2:
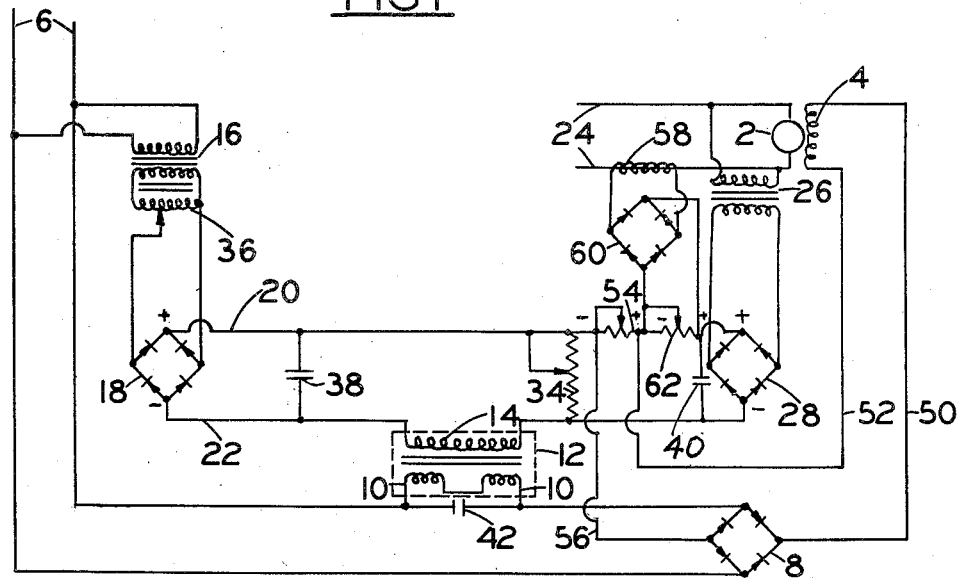
Fig. 2 is a circuit diagram illustrating a modification of the voltage regulator system of Fig. 1.

In order to increase the sensitivity of the system and to compensate for variations in generator load current, the circuit of Fig. 2 may be employed. This circuit is substantially the same as that of Fig. 1 in that it includes a generator 2, to be regulated, having a field winding 4 supplied with current from a suitable source 6 through rectifier 8 and line 50. The return line 52 from the field winding 4 extends to a feedback resistor 54 located between the output of armature voltage rectifier 28 and biasing resistance 34. Conductor 56 extends from the resistor 54 back to the negative terminal of rectifier 8. The current flowing in the field circuit thus is influenced in response to changes in the armature voltage of generator 2 whereby it is rendered more responsive to variations in operation of the generator.

In order further to compensate for changes in the loading of generator 2, a current transformer 58 is provided in the armature circuit 24. Any change in armature current therefore induces a current in the winding of the current transformer 58 which is passed through rectifier 60 and impressed on the output of rectifier 28 across resistance 62. In this way, the changes in the current from rectifier 60 are such as to produce a voltage proportional to the loading on the generator in opposition to that of rectifier 28. This will vary the effective current from rectifier 28, and thereby varying the current from the constant voltage source through the control winding in such a way as to compensate for the load taken from the armature.

Figure 3:
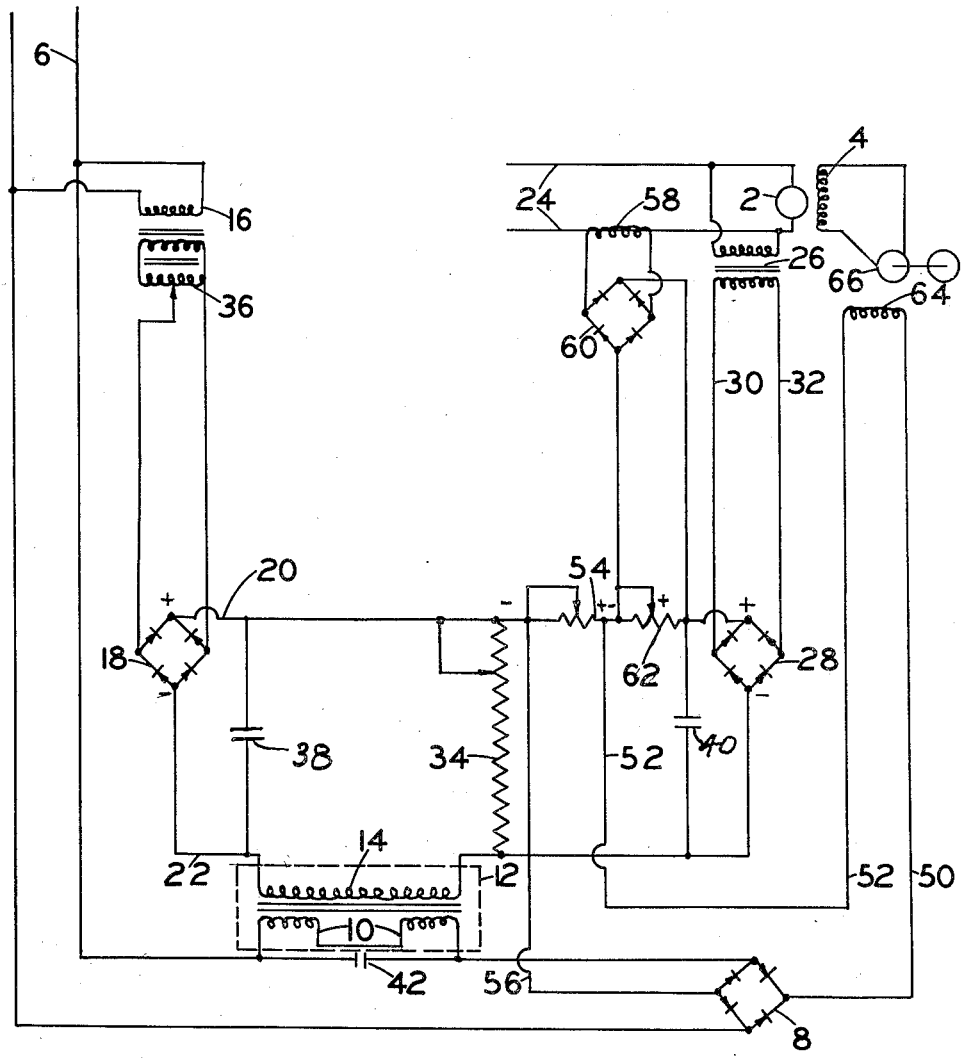
Fig. 3 is a circuit diagram illustrating a modification of the voltage regulator system of Fig. 2.

As shown in Fig. 3, the circuit is the same as that of Fig. 2 except that, in instances where the generator may be of such size as to make it inconvenient or impractical to obtain the field current through a saturable reactor and dry type rectifiers, the output from rectifier 8 may be fed to the field 64 of a motor driven exciter 66 of sufficient power to supply the current in the generator field 4.

In each of the embodiments of the invention chosen for purposes of illustration the saturable reactor 12 is actuated by a control winding included in series with the rectifier 18 so that current can only flow in one direction in the control winding and reversing of the reactor with resulting loss of control in the system is impossible. While other types of rectifiers may be used in the reactor control circuit and elsewhere, dry disc rectifiers have been found satisfactory. Similarly, various forms of saturable core reactors may be chosen. A conventional three leg reactor is generally satisfactory.

Although the invention has been described above with particular reference to its use in controlling the operation of a generator, the voltage regulator is of general application and may be used in other combinations and circuit arrangements with or without the use of a saturable reactor. For instance the control current may, instead of being used to actuate a saturable reactor, be used in conjunction with a thyratron or other device where the operation is triggered from a low potential control element. Numerous other changes and modifications may be made in the circuit and its application and therefore, it should be clearly understood that the forms of the invention described above and shown in the accompanying drawings are intended to be illustrative only and are not intended to limit the scope of the invention.

I claim:

1. Means for regulating the voltage of a generator having an armature circuit and a field winding, said means comprising a constant voltage transformer, a saturable reactor having a control winding and a reactive winding, a pair of rectifiers having their outputs connected in opposing relation and in series with the control winding of said saturable reactor, one of said rectifiers being supplied by said constant voltage transformer, the other rectifier being supplied by said armature circuit, a biasing resistance connected across the output of the armature circuit rectifier to supply said control winding with current from said constant voltage transformer in response to the difference in voltage between said armature circuit and said constant voltage transformer, and a circuit including said reactive windings for controlling the current to said field winding.

2. Means for regulating the voltage of a generator having an armature circuit and a field winding, an exciter having a field winding and supplying excitation current to said generator field winding, said means comprising a constant voltage transformer, a saturable reactor having a control winding and a reactive winding, a pair of rectifiers having their outputs connected in opposing relation and in series with the control winding of said saturable reactor, one of said rectifiers being supplied by said constant voltage transformer, the other rectifier being supplied by said armature circuit, a biasing resistance connected across the output of the armature circuit rectifier to supply said control winding with current from said constant voltage transformer in response to the difference in voltage between said armature circuit and said constant voltage transformer, and a circuit including said reactive windings for controlling the current to said exciter field winding.

3. Means for regulating the voltage of a generator having an armature circuit and a field winding comprising a potential transformer connected across said armature circuit, a saturable reactor having a control winding and a reactive winding, a first rectifier supplied by said potential transformer, a source of alternating current independent of said generator, a constant voltage transformer supplied by said source, a second rectifier connected to receive current from said constant voltage transformer and to feed current in opposition to said first named rectifier and through said control winding, a biasing resistance connected across the output of said first rectifier, a third rectifier connected across said field winding, and a circuit supplying current to said third rectifier from said source of alternating current and including said reactive windings of said saturable reactor.

4. Means for regulating the voltage of a generator having an armature circuit and a field winding comprising a potential transformer connected across said armature circuit, a saturable reactor having a control winding and a reactive winding, a first rectifier supplied by said potential transformer, load compensating and field current compensating resistances fed by said first rectifier, a source of alternating current independent of said generator, a constant voltage transformer supplied by said source, a second rectifier supplied by said constant voltage transformer and having its output connected in opposition to said first named rectifier and connected to pass current in series through said control winding, a biasing resistance connected across the output of said first rectifier in series with said compensating resistors, a third rectifier connected across said field winding through said field current compensating resistance and in voltage opposition to the output of said first rectifier, a circuit supplying said third rectifier from said source of alternating current through said reactive winding of said saturable reactor, a current transformer in said generator armature circuit feeding a fourth rectifier the output of which is connected in voltage opposition to the output of said first rectifier across said load compensating resistance.

References Cited in the file of this patent

UNITED STATES PATENTS

| | | |
|---|---|---|
| 2,525,451 | Graves | Oct. 10, 1950 |
| 2,675,518 | Morgan | Apr. 13, 1954 |
| 2,725,517 | Rogers | Nov. 29, 1955 |